United States Patent
Vion et al.

(10) Patent No.: US 9,630,704 B2
(45) Date of Patent: Apr. 25, 2017

(54) BLADE FOR A FAN OF A TURBOMACHINE, NOTABLY OF THE UNDUCTED FAN TYPE, CORRESPONDING FAN AND CORRESPONDING TURBOMACHINE

(71) Applicants: SNECMA, Paris (FR); ONERA, Chatillon (FR)

(72) Inventors: Laurence Vion, Paris (FR); Gregory Delattre, Clamart (FR); Laurent Jacquin, Le Chesnay (FR); Benoit Rodriguez, Versailles (FR); Ronan Boisard, Chatillon (FR); Biel Ortun, Paris (FR); Fabrice Falissard, Sceaux (FR)

(73) Assignees: SNECMA, Paris (FR); ONERA, Chatillon (FR)

( * ) Notice: Subject to any disclaimer, the term of this patent is extended or adjusted under 35 U.S.C. 154(b) by 468 days.

(21) Appl. No.: 14/347,940

(22) PCT Filed: Sep. 28, 2012

(86) PCT No.: PCT/FR2012/052202
§ 371 (c)(1),
(2) Date: Mar. 27, 2014

(87) PCT Pub. No.: WO2013/045859
PCT Pub. Date: Apr. 4, 2013

(65) Prior Publication Data
US 2014/0301844 A1    Oct. 9, 2014

(30) Foreign Application Priority Data
Sep. 29, 2011  (FR) ..................... 11 58770

(51) Int. Cl.
*B64C 11/18*    (2006.01)
*F01D 5/14*    (2006.01)
(Continued)

(52) U.S. Cl.
CPC .............. *B64C 11/18* (2013.01); *B64C 11/48* (2013.01); *F01D 5/141* (2013.01); *F01D 5/145* (2013.01);
(Continued)

(58) Field of Classification Search
CPC ......... B64C 11/18; B64C 11/48; F01D 5/141; F01D 5/145
(Continued)

(56) References Cited

U.S. PATENT DOCUMENTS

| 5,190,441 A | 3/1993 | Murphy et al. |
| 6,231,308 B1 | 5/2001 | Kondo et al. |

(Continued)

FOREIGN PATENT DOCUMENTS

| DE | 198 12 624 A1 | 9/1999 |
| EP | 0 867 363 A2 | 9/1998 |
| EP | 2 368 795 A2 | 9/2011 |

OTHER PUBLICATIONS

International Search Report issued Feb. 14, 2013, in PCT/FR12/052202 filed Sep. 28, 2012.

*Primary Examiner* — Kevin Lee
(74) *Attorney, Agent, or Firm* — Oblon, McClelland, Maier & Neustadt, L.L.P.

(57) ABSTRACT

A blade for a fan of a turbomachine, for example of unducted fan type, a corresponding fan, and a corresponding turbomachine. The blade includes a mechanism arranged, at a single location, to locally, as the fan rotates, disturb a distribution of flow around the blade so as to form two independent main vortices downstream.

5 Claims, 2 Drawing Sheets

(51) Int. Cl.
*B64C 11/48* (2006.01)
*B64C 3/14* (2006.01)
*B64D 27/00* (2006.01)

(52) U.S. Cl.
CPC .. *B64C 2003/148* (2013.01); *B64D 2027/005* (2013.01); *F05D 2220/324* (2013.01); *F05D 2220/325* (2013.01); *Y02T 50/66* (2013.01); *Y02T 50/673* (2013.01)

(58) Field of Classification Search
USPC ............................................... 416/129
See application file for complete search history.

(56) References Cited

U.S. PATENT DOCUMENTS

| | | | |
|---|---|---|---|
| 6,318,677 B1 | 11/2001 | Dixon | |
| 8,221,081 B2 * | 7/2012 | Lebrun | B64C 11/18 416/129 |
| 8,864,470 B2 * | 10/2014 | Belmonte et al. | B64C 11/06 416/156 |
| 2001/0014285 A1 | 8/2001 | Schlechtriem | |
| 2010/0124500 A1 | 5/2010 | Lebrun | |
| 2011/0223020 A1 | 9/2011 | Lavrenko | |

* cited by examiner

BLADE FOR A FAN OF A TURBOMACHINE, NOTABLY OF THE UNDUCTED FAN TYPE, CORRESPONDING FAN AND CORRESPONDING TURBOMACHINE

BACKGROUND OF THE INVENTION

Field of the Invention

The present invention relates to a blade for a fan of a turbomachine, notably of unducted fan type, a corresponding fan and a corresponding turbomachine.

Although the present invention is particularly suited to turbomachines with unducted fan (also described as "open rotor"), its use is not however limited to such an application.

Description of the Related Art

As is known, a turbomachine with unducted fan can comprise two coaxial and contra-rotating outer fans, respectively upstream (front) and downstream (rear), which are each driven in rotation by a turbine and which extend, substantially radially, outside the nacelle of the turbomachine. Each fan usually comprises a hub that is concentric to the longitudinal axis of the turbomachine, with blades fastened to it.

However, the aerodynamic interaction between the upstream and downstream contra-rotating fans of such a turbomachine with unducted fan generates high operating acoustic levels. In practice, the rotation of the blades of the upstream and downstream contra-rotating fans provokes the formation of:

wakes along the span of the blades, downstream thereof;
marginal vortices at the free end of the blades; and
turbulences at the base of the blades.

These aerodynamic disturbances downstream of the upstream fan are the source of aerodynamic interaction noise when they strike the downstream fan or pass in proximity thereto.

In particular, during phases of low-speed operation of a turbomachine with unducted fan (such as, when it is mounted on an aircraft, when taxiing, taking off, landing and on approach), the dominant contribution of the radiated noise originates from the lines of interaction associated with the downstream fan which is operating in the stream from the upstream fan, by passing through the vortex sheets made up of wakes and marginal vortices formed by the blades of the upstream fan (also called upstream blades). When a marginal vortex from upstream blades interacts with the blades of the downstream fan (otherwise called downstream blades), the downstream blade-marginal vortex interaction dominates the radiated acoustic spectrum for most of the directivities.

Also, to reduce the undesirable sound emissions from such turbomachines and thus satisfy the acoustic certification criteria imposed by the aeronautical authorities, it is necessary to reduce the radiated noise at low speed by reducing the downstream blade-marginal vortex interaction.

Currently, the most widely-used known solution—called clipping—consists in reducing the diameter of the downstream fan, so as to make the marginal vortices generated by the upstream blades pass outside the downstream blades to limit the interaction of the latter with the marginal vortices. This generally entails increasing the chord of the downstream blades to maintain the desired traction and the torque ratio between the upstream and downstream fans. Such a solution can be pushed to the limit by very strongly loading the end of the upstream blades, so as to unload the rest of each of the upstream blades to reduce the impact of the wake from the upstream fan on the downstream fan, which is also the source of undesirable interaction noise.

However, such a solution proves acceptable only for an isolated and incidence-free configuration of the turbomachine (that is to say, with no external element linked to it). In the presence of elements (strut, fuselage) or of incidence, the contraction and the axisymmetry of the air flow behind the upstream fan are modified, so that the clipping produced no longer prevents the interaction of the downstream blades and of the marginal vortices generated by the upstream blades. A significant reduction of the height of the downstream blades (corresponding to a significant clipping) entails increasing the chord associated with the downstream blades so as to retain the load, which degrades the efficiency of the associated turbomachine and is not therefore satisfactory.

BRIEF SUMMARY OF THE INVENTION

The object of the present invention is to remedy this drawback and, in particular, to substantially reduce the noise radiated by a turbomachine with unducted fan with twin contra-rotating fans by weakening the downstream blade-marginal vortex interaction.

To this end, according to the invention, the blade for a fan of a turbomachine, notably of unducted fan type, is noteworthy in that it comprises means arranged, at a single location, so as to locally disturb, as the fan rotates, the distribution of the flow around the blade, so as to form two independent main vortices downstream, the disturbing means comprising a single protuberance formed on the leading edge of the blade is characterized in that the single protuberance is defined by its span position h such that 0.75 H<h<0.85 H, H being the height of the blade.

Thus, by virtue of the invention, the distribution of the flow around the blade is modified so as to provoke two main vortices:

a first natural vortex (or marginal vortex) being formed at the free end of the blade;
a distinct second forced vortex (or supplementary main vortex) occurring in the vicinity of the disturbance means.

The marginal and supplementary vortices are co-rotary (that is to say that they exhibit the same direction of rotation) and remain independent of one another as far as the downstream fan. By virtue of the invention, a modification of the distribution of the flow is produced around a single local position and the result is the formation of two vortices—of weaker intensity than the single marginal vortex currently observed—which do not merge together. Furthermore, the performance levels of an upstream fan comprising blades that conform to the invention are not modified by comparison with an upstream fan equipped with blades without the disturbance means of the invention.

According to the present invention, the disturbing means comprise a single protuberance formed on the leading edge of the blade, which makes it possible to create co-rotating marginal and supplementary vortices accompanied by the formation of contra-rotating auxiliary vortices (that is to say that they exhibit a direction of rotation that is the reverse of that of the two co-rotating vortices) inserted between the two co-rotating vortices, which prevents them from merging and keeps them independent of one another as far as the blades of the downstream fan. It should be noted that the addition of a supplementary protuberance leads to the rapid merging of the two marginal and supplementary vortices, which is not desirable.

Advantageously, the single protuberance is defined by:
its span position h such that 0.75 H<h<0.85 H, H being the height of the blade,
and, optionally, by;
its span height d such that 0.05 H<d<0.2 H;
its chord width l such that c/16<l<c/8, c being the length of the local chord of the blade at the span position h of said protuberance.

In a variant conforming to the invention, the blade can comprise a notch which is formed in the leading edge of said blade and which is adjacent to said protuberance.

Moreover, the present invention relates also to a fan, notably for a turbomachine with unducted fan, which comprises a plurality of blades of the type of that described above.

Furthermore, the present invention also relates to a turbomachine comprising at least one fan of the type of that mentioned previously.

In particular, when the turbomachine is of the unducted fan type and comprises two coaxial and contra-rotating fans, at least the upstream fan is advantageously of the type of that detailed above.

BRIEF DESCRIPTION OF THE SEVERAL VIEWS OF THE DRAWINGS

The figures of the attached drawing will give a good understanding as to how the invention can be produced. In these figures, identical references designate similar elements.

DETAILED DESCRIPTION OF THE INVENTION

Figure 1:
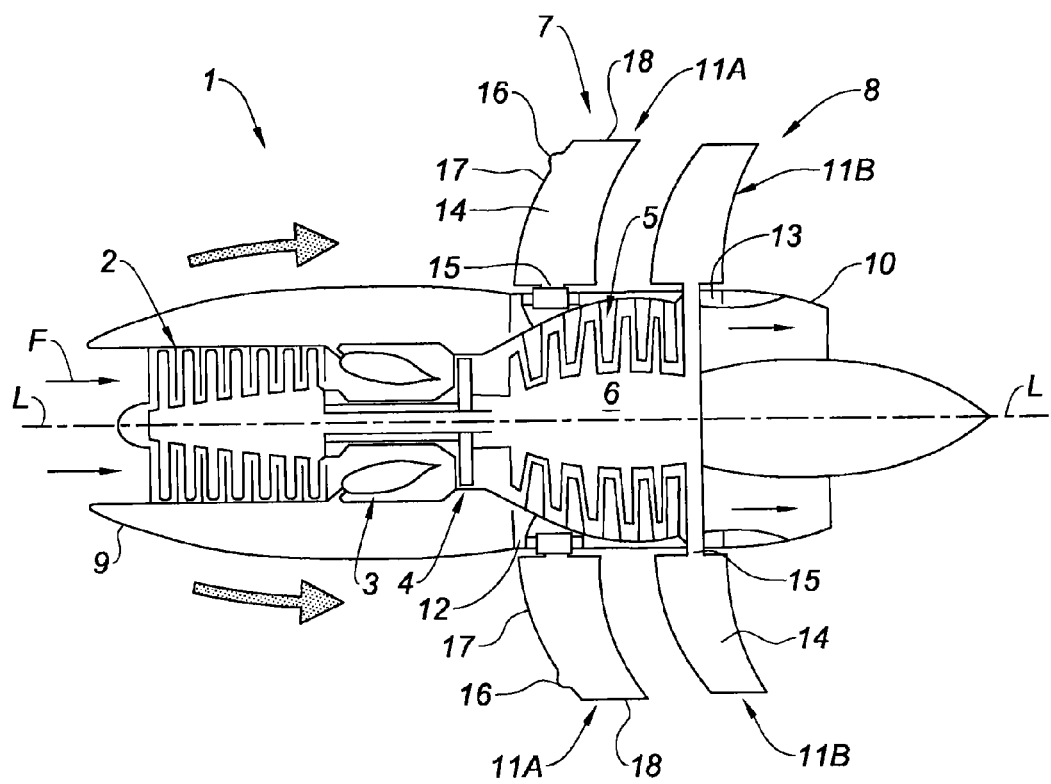
FIG. 1 is a schematic view in longitudinal cross section of a turbomachine with unducted fan equipped with upstream blades according to an embodiment conforming to the invention.

FIG. 1 shows, schematically, a turbomachine with unducted fan 1, conforming to the invention, which comprises, from upstream to downstream, in the direction of flow of the gases (symbolized by the arrow F) inside the turbomachine of longitudinal axis L-L, a compressor 2, an annular combustion chamber 3, a high-pressure turbine 4 and two low-pressure turbines 5 and 6 which are contra-rotating, that is to say that they rotate in two opposite directions about the longitudinal axis L-L.

Each of the low-pressure turbines 5 and 6 is secured in rotation to an outer fan 7, 8 extending radially outside the nacelle 9 of the turbomachine 1, the nacelle 9 being substantially cylindrical and extending along the axis L-L around the compressor 2, the combustion chamber 3 and the turbines 4, 5 and 6. The combustion gases outgoing from the turbines are expelled through a nozzle 10 to increase the thrust.

The fans 7 and 8 are arranged coaxially one behind the other and comprise a plurality of blades 11A and 11B which are distributed equi-angularly about the longitudinal axis L-L. The blades 11A and 11B extend substantially radially and are of the type with variable setting, that is to say that they can rotate about their longitudinal axis so as to optimize their angular position according to the desired operating conditions of the turbomachine 1. Obviously, as a variant, the blades of the fans could also be of fixed setting.

Each upstream 7 or downstream 8 fan comprises a rotating hub 12, 13 supporting the blades 11A, 11B and arranged concentrically to the longitudinal axis L-L of the turbomachine 1, at right angles thereto.

The upstream 11A and downstream 11B blades are each formed by a blade body 14 and a blade foot 15, mounted to rotate on the corresponding hub 12, 13.

Figure 2:
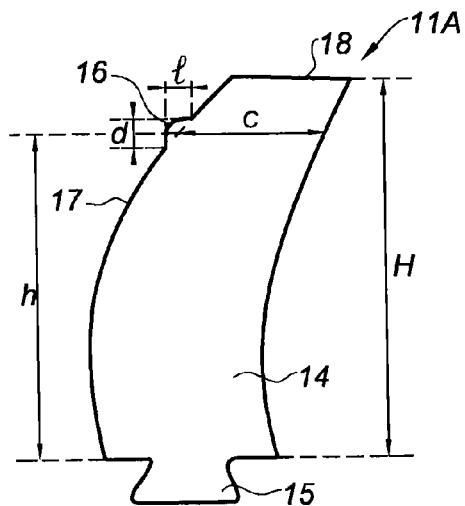
FIG. 2 is an enlarged schematic view in elevation of an upstream blade of FIG. 1.

In the embodiment of FIG. 2 conforming to the invention, each blade 11A of the upstream fan 7 comprises a single protuberance 16 formed on the leading edge 17 of said blade 11A concerned.

Furthermore, the single protuberance 16, of rounded form, is advantageously defined by the following parameters:
its span position h, which is between 0.75 H and 0.85 H, with H being the height of the upstream blade 11A;
its span height d, which is between 0.05 H and 0.2 H; and
its chord width l, which is between c/16 and c/8, with c being the length of the local chord of the blade at the span position h of said protuberance 16.

Thus, the single protuberance makes it possible to disturb the distribution of the flow around the upstream blade 11A, which provokes two co-rotating main vortices:
a first natural vortex (or marginal vortex) being formed at the free end 18 of the upstream blade 11A;
a distinct second forced vortex (or supplementary main vortex) occurring in the vicinity of the single protuberance 16.

Furthermore, the single protuberance 16 also causes the formation of contra-rotating auxiliary vortices (that is to say of a direction contrary to the two marginal and supplementary vortices) which are inserted between the two co-rotating main vortices, thus preventing them from merging.

In other words, as the upstream fan 7 rotates, the single protuberance 16 locally disturbs the distribution of the flow around the upstream blade 11A, so as to form two independent main vortices downstream which remain independent as far as the downstream fan 8.

Figure 3:
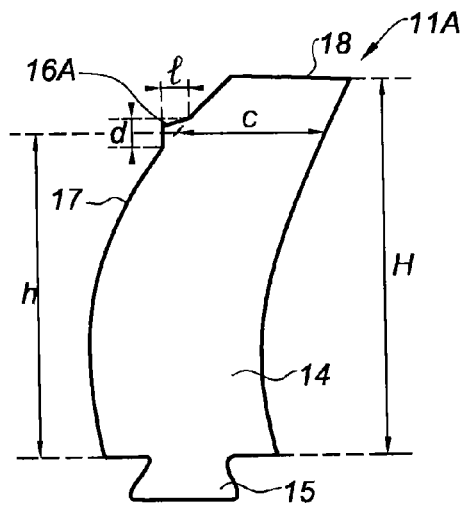
FIGS. 3 to 5, similar to FIG. 2, represent three variant embodiments of the upstream blade of FIG. 2, conforming to the present invention.
Figure 4:
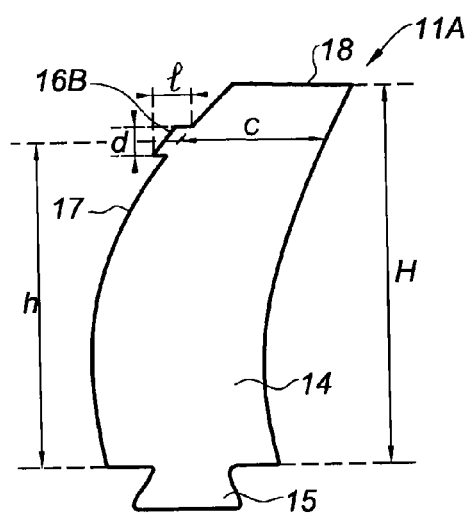
Figure 5:
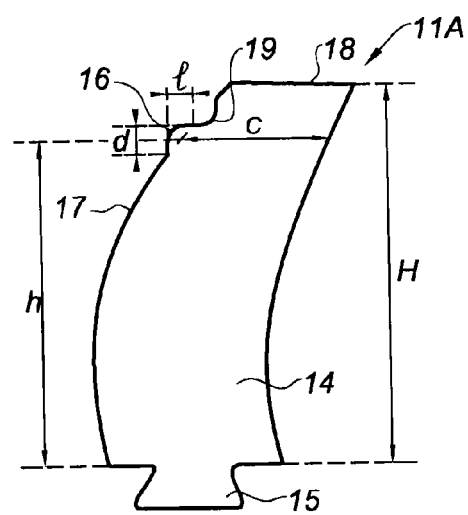

Moreover, FIGS. 3 to 5 show three variant embodiments of the protuberance of the upstream blade 11A, conforming to the invention.

In particular, the protuberances 16A and 16B of FIGS. 3 and 4 are of respectively triangular and rectangular form. The associated parameters h, d and l are similar to those of the protuberance 16 of FIG. 2.

Furthermore, in another variant conforming to the invention, as shown in FIG. 5, a notch 19 formed in the leading edge 17 of the upstream blade 11A is associated with the protuberance 16. The notch 19, which is adjacent to the protuberance 16, is arranged between the latter and the free end 18 of the upstream blade 11A. As a variant, it would be possible to envisage having the protuberance arranged between the notch and the free end of the upstream blade.

The invention claimed is:
1. A turbomachine with an unducted fan, comprising:
two coaxial and contra-rotating fans, respectively upstream and downstream, the upstream and downstream fans comprising a plurality of blades,
wherein the blades of the upstream fan comprise means arranged, at a single location, to locally disturb, as the upstream fan rotates, distribution of flow around the blade, to form two independent main vortices downstream,
wherein the means consists of a single protuberance formed on a leading edge of the blade, and which is defined by a span position h such that $0.75 H \leq h \leq 0.85 H$, H being a height of the blade.

2. The turbomachine as claimed in claim 1, wherein the single protuberance is defined by its span height d such that $0.05 H < d < 0.2 H$, H being the height of the blade.

3. The turbomachine as claimed in claim 1, wherein the single protuberance is defined by a chord width l such that $c/16 < l < c/8$, c being a length of a local chord of the blade at the span position h of the single protuberance.

4. The turbomachine as claimed in claim 1, further comprising a notch formed in the leading edge of the blade and which is adjacent to the single protuberance.

5. The turbomachine as claimed in claim 1, wherein a trailing edge of the blades of the upstream fan is free of any protuberance or concavity.

* * * * *